United States Patent
Albert

(10) Patent No.: US 9,987,980 B2
(45) Date of Patent: Jun. 5, 2018

(54) COVERING DEVICE WITH A LIGHT SOURCE

(71) Applicant: WEBASTO SE, Stockdorf (DE)

(72) Inventor: Jean-Paul Albert, Saint Pierre des Echaubrognes (FR)

(73) Assignee: WEBASTO SE, Stockdorf (DE)

( * ) Notice: Subject to any disclaimer, the term of this patent is extended or adjusted under 35 U.S.C. 154(b) by 427 days.

(21) Appl. No.: 14/408,516

(22) PCT Filed: May 27, 2013

(86) PCT No.: PCT/EP2013/060883
§ 371 (c)(1),
(2) Date: Dec. 16, 2014

(87) PCT Pub. No.: WO2013/189697
PCT Pub. Date: Dec. 27, 2013

(65) Prior Publication Data
US 2015/0175064 A1    Jun. 25, 2015

(30) Foreign Application Priority Data
Jun. 18, 2012    (FR) ..................... 12 01735

(51) Int. Cl.
*F21V 9/00*    (2018.01)
*B60Q 3/51*    (2017.01)
(Continued)

(52) U.S. Cl.
CPC ............. *B60Q 3/51* (2017.02); *B60J 7/0007* (2013.01); *B60J 7/0015* (2013.01); *B60Q 3/208* (2017.02); *B60Q 3/64* (2017.02); *B60Q 3/66* (2017.02)

(58) Field of Classification Search
USPC ......................................... 362/511
See application file for complete search history.

(56) References Cited

U.S. PATENT DOCUMENTS 4,977,487 A    12/1990    Okano
5,099,905 A *    3/1992    Rigter ................. E06B 9/54
                                        160/264
(Continued)

FOREIGN PATENT DOCUMENTS

CN         1446297 A        10/2003
DE    199 14 427 A1        10/2000
(Continued)

OTHER PUBLICATIONS

International Search Report dated Sep. 27, 2013, issued in International Application PCT/EP2013/060883.

*Primary Examiner* — Rafferty Kelly
(74) *Attorney, Agent, or Firm* — Fitch, Even, Tabin & Flannery LLP

(57) ABSTRACT

A covering device to be fastened opposite an opening of a motor vehicle and comprises at least one element which is fastened on the circumference of the opening, wherein a covering unit is displaced in an expansion direction between a storage position, in which the covering unit is released from the opening, and a covering position, in which the covering unit is extended opposite the opening, wherein the covering unit comprises a network of optical fibers having lateral light scattering. The network of optical fibers is supplied with light by at least one light source which is fastened on the element and, in order to supply the network of optical fibers with light, can illuminate ends of the optical fibers of the network in at least one illuminating position of the covering unit.

9 Claims, 3 Drawing Sheets

(51) Int. Cl.
*B60J 7/00* (2006.01)
*B60Q 3/64* (2017.01)
*B60Q 3/66* (2017.01)
*B60Q 3/208* (2017.01)

(56) References Cited

U.S. PATENT DOCUMENTS

| | | |
|---|---|---|
| 7,234,583 B2 | 7/2007 | Givoletti |
| 8,829,539 B2 | 9/2014 | Kleo et al. |
| 2003/0156426 A1* | 8/2003 | Givoletti .................. B60Q 3/54 362/556 |
| 2012/0320621 A1 | 12/2012 | Kleo et al. |

FOREIGN PATENT DOCUMENTS

| | | | |
|---|---|---|---|
| DE | 199 36 537 A1 | 2/2001 | |
| DE | 19936537 A1 * | 2/2001 | ............ B60J 1/2041 |
| DE | 103 45 002 A1 | 4/2005 | |
| DE | 10 2009 025120 A1 | 4/2010 | |
| DE | 10 2011 103319 A1 | 12/2011 | |
| FR | 2 905 723 A1 | 3/2008 | |
| FR | 2 934 204 A1 | 1/2010 | |
| FR | 2 964 917 A1 | 3/2012 | |
| JP | 2005112164 A | 4/2005 | |
| JP | 2008174132 A | 7/2008 | |
| JP | 2010-513737 A | 4/2010 | |
| JP | 2010-267573 A | 11/2010 | |
| JP | 2013517989 A | 5/2013 | |
| KR | 10 2009-0011554 A | 2/2009 | |
| KR | 10 2009 0115543 A | 11/2009 | |
| WO | 02/12785 A1 | 2/2002 | |

* cited by examiner

COVERING DEVICE WITH A LIGHT SOURCE

CROSS REFERENCE TO RELATED APPLICATIONS

This application is a U.S. national phase application filed under 35 U.S.C. § 371 of International Application No. PCT/EP2013/060883, filed May 27, 2013, designating the United States, which claims priority from French Patent Application No. 12/01735, filed Jun. 18, 2012, which are all hereby incorporated herein by reference in their entirety for all purposes.

TECHNICAL FIELD

The present invention relates to a covering device having a light source. In particular, said covering device has an application in devices which are integrated in a motor vehicle.

PRIOR ART

The motor vehicles are often equipped with an opening which is configured in the car roof, wherein the opening is closed off by a transparent panel in order to allow light to enter the interior of the passenger cabin. The transparent panel, for example of glass, may be installed in a fixed or movable manner, so as to enable the opening to be at least partially exposed. The potential for the user of covering this opening with the aid of a covering device is also created.

A covering device according to a special type comprises a winding-up device onto which a web is wound up. A pull rod is fastened along a periphery of the web, parallel to the axis of the winding-up device, and tensioning means for tensioning the web between the pull rod and the winding-up device are provided. The winding-up device is fastened beneath the car roof, wherein the axis is arranged along a periphery of the opening. The web can thus be arranged opposite the opening in that traction is exerted on the pull rod and in that the web is unwound from the winding-up device. The pull rod may likewise be converged with the winding-up device in order to wind up the web and to expose the opening.

Another type of covering device in which the covering unit is manufactured from one or more rigid flaps which are attached in a sliding manner, parallel to the plane of the opening, is also known. Document FR 2 905 723 A1 shows an example of a covering device of this type.

It has already been proposed to equip the flexible roof of a convertible vehicle with a network of optical fibers in order to realize distributed illumination and to impart the roof in the interior of the vehicle a luminescent appearance. Document FR 2 934 204 A1 shows an example of this type. One or more light sources are fastened on the web and are supplied by way of a power network which is connected to an electrical power supply. In one version, the light source supplies light to a network of optical fibers.

An embodiment of this type requires the fastening of a generally rigid light source on a flexible element, which raises reliability issues. Moreover, said embodiment is limited to cases in which the electrical supply to the light source can be implemented, that is to say to those cases in which the flexible element has a part which is fastened on the body. This solution is consequently not applicable when the support is completely movable, as is the case in the previously mentioned covering units.

Document FR 2 964 917 A1 also discloses a covering device in the rails of which a beam waveguide is arranged, in order for the rail to be an illumination source. However, the illumination is limited to the peripheries of the device.

The invention is aimed at providing a covering device which integrates at least one light source and offers greater application possibilities than the prior art.

DESCRIPTION OF THE INVENTION

With a view to these objectives the invention according to the embodiments has a covering device which is to be fastened opposite an opening of a motor vehicle as the subject matter, wherein the device comprises at least one element which is fastened on the circumference of the opening, wherein a covering unit is displaced in an expansion direction between a storage position, in which the covering unit is released from the opening, and a covering position, in which the covering unit is extended opposite the opening, characterized in that the covering unit comprises a network of optical fibers having lateral light scattering, wherein the optical-fiber network is supplied with light by at least one light source which is fastened on the element and, in order to supply the network of optical fibers with light, can illuminate ends of the optical fibers of the network in at least one illuminating position of the covering unit.

The device makes it possible for the movable covering unit to be used for scattering the light, while the light source is arranged in a fixed place where its fastening can be highly reliable. It is not necessary to accommodate a light source on the covering unit and also not necessary to provide a supply of electrical power thereon. The optical fibers have a lateral scattering, that is to say that the light is emitted therefrom along their entire length and not only at the end. Said optical fibers enable illumination in a distributed manner on the entire surface which is covered by the optical fibers. It may be provided that the network of optical fibers forms a special shape which becomes visible when the optical fibers are supplied with light and which is not or practically not visible in the absence of any illumination.

According to embodiments, the ends of the optical fibers are grouped together at the height of at least one head, wherein the head is opposite the light source in the illuminating position. Numerous optical fibers can thus be supplied by a single light source. The optical fibers are sufficiently flexible so as to be distributed on the surface of the covering unit, proceeding from the head.

In a special way, the illuminating position is the covering position. The illumination is obtained when the covering unit is expanded in front of the opening and is thus largely visible from the interior of the vehicle.

According to a special feature, the head is oriented in the expansion direction, wherein the element is a forward cross member of the device. The forward cross member is attained by way of a periphery of the covering unit when said covering unit is expanded opposite the opening. The head is displaced directly in the direction of the light source in order to be finally located opposite the latter.

According to embodiments, the element is a guide rail for guiding the covering unit in the expansion direction, wherein the optical fibers comprise an end along a lateral periphery of the covering unit in order for the end to thus be illuminated by the light source. In this configuration the light source is supported by the rail and illuminates the periphery of the covering unit in order to transmit the light to the optical fibers. The periphery of the covering unit remains at a constant distance from the light source.

According to embodiments, the device comprises a plurality of light sources which are distributed along the rail. The sources may function in a simultaneous manner, but is also possible for the amplitude of the illumination to be modulated over time in order to generate animations. The color of the light source may vary and even be likewise modulated.

According to one constructive arrangement, the light source is a beam waveguide which extends along the rail and can scatter the light in the direction of the covering unit. The beam waveguide uses only a single light source and makes it possible for the light to be distributed along the entire rail. The ends of the optical fibers do not have to be grouped together and they may be illuminated in an arbitrary position of the covering unit.

According to a special arrangement, the rail comprises a wing which extends substantially parallel to the covering unit, wherein the rail comprises screening means in order to displace the covering unit toward the wing. Little space is thus left between the wing and the covering unit, preventing light from passing through at this level. This prevents the creation of excessively illuminated points which would disturb the occupants of the vehicle and would mask the effect of the illumination by the optical fibers.

In particular, the screening means are a brush having hairs which protrude toward the covering unit, wherein the covering unit is arranged between the brush and the wing. The force for screening is thus light and highly yielding, and on account of applying low friction forces allows the covering unit to slide on the brush.

According to one constructive arrangement, the covering unit comprises a fabric web which integrates the network of optical fibers. The optical fibers are directly integrated in the web, for example during weaving. The optical fibers are particularly well integrated in the web. The ends of the optical fibers may be extracted or grouped together at the height of the head, or simply end at the periphery of the web.

According to one arrangement, the web in the storage position is wound up around a winding-up device. The optical fibers are sufficiently flexible for a web which integrates the former to be wound up, irrespective of whether the optical fibers extend parallel to the winding-up axis or not.

According to one embodiment, the covering unit comprises at least one flap which on the surface is covered by the network of optical fibers. The optical fibers may also be fastened on a rigid sliding flap, for example by way of adhesive bonding or welding.

BRIEF DESCRIPTION OF THE FIGURES

Further advantages, features and refinements are derived from the following examples which are explained in the context of the figures, in which.

DETAILED DESCRIPTION OF EXEMPLARY EMBODIMENTS

Figure 1:
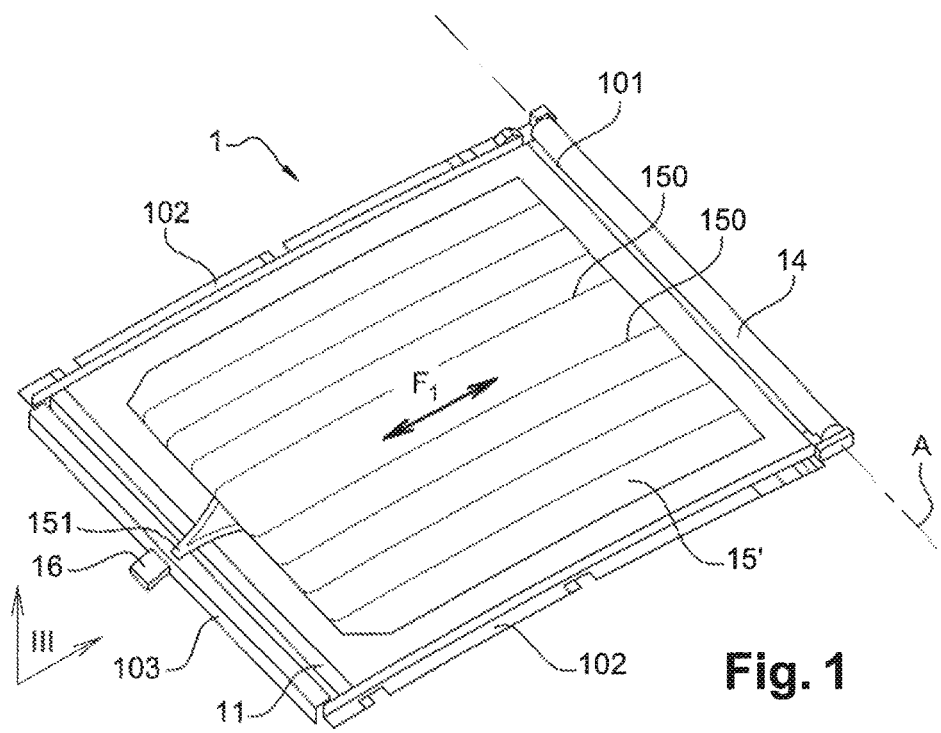
FIG. 1 shows a perspective view from above of a covering device according to a first embodiment of the invention, wherein a covering unit is in the expanded position.
Figure 2:
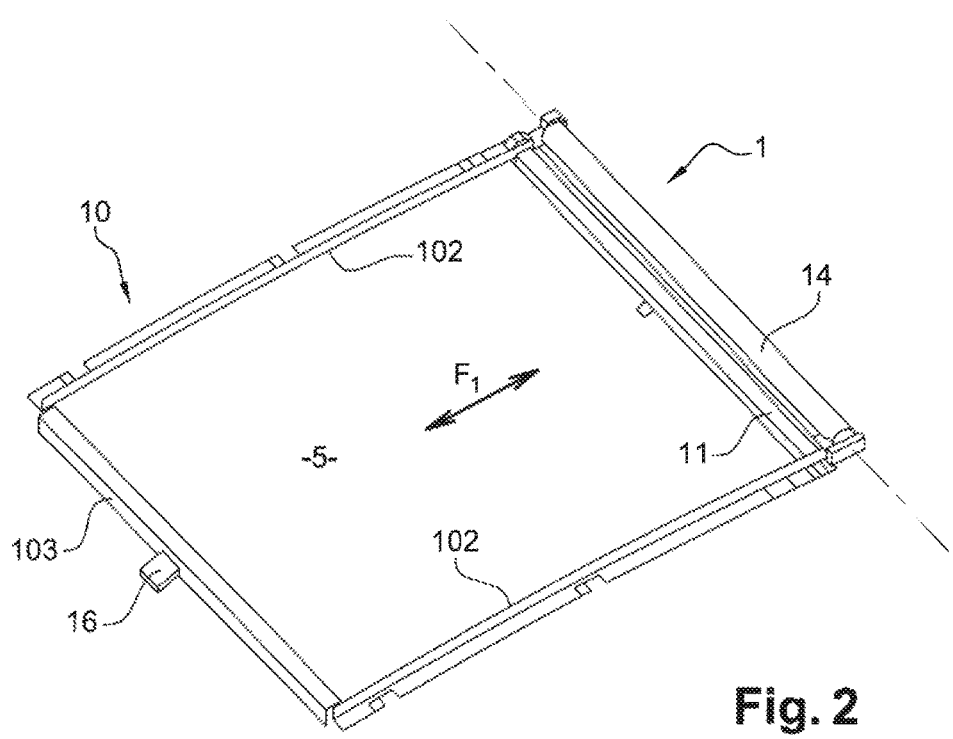
FIG. 2 shows a view which is similar to that of FIG. 1, wherein the covering unit is in the storage position.
Figure 3:
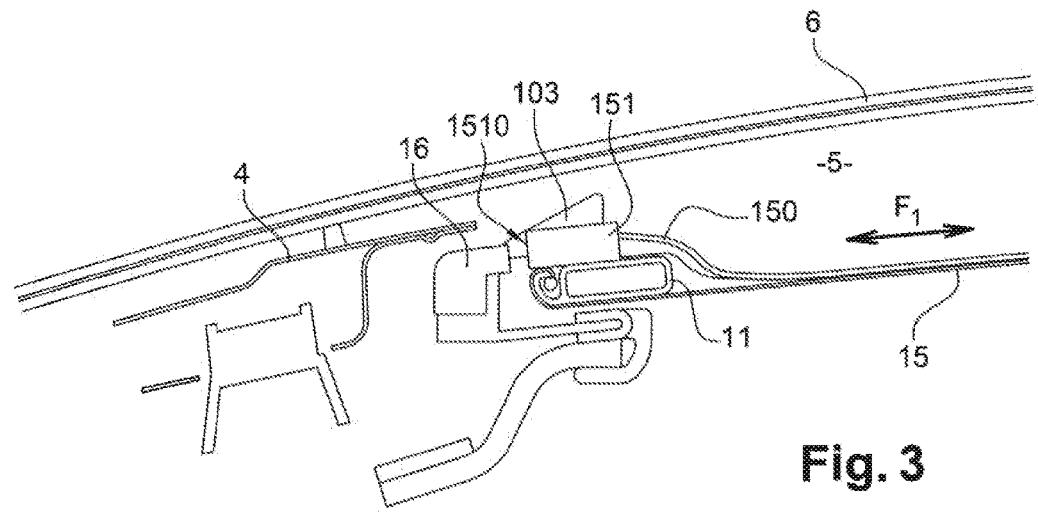
FIG. 3 shows a sectional view according to plane III of FIG. 1, showing the covering device in place beneath the car roof of a vehicle.

A covering device 1 according to an embodiment as shown in FIGS. 1 to 3 comprises a frame 10 which is to be fastened beneath the car roof 4 of a vehicle, opposite a paned opening 5 having, for example, a fixed glass panel 6. The directions used in this description refer to those which relate to the vehicle in a usual position when in use. The frame 10 comprises two lateral rails 102, in which a pull rod 11 is displaced between an expanded position, such as illustrated in FIG. 1, and a storage position, such as illustrated in FIG. 2. The rearward cross member 101 comprises a winding-up device 14 which extends along the entire length of the rearward cross member 101. The winding-up device 14 is rotatably attached about a winding-up device axis A, and a web 15 is wound up onto the winding-up device 14. The web 15 which forms a covering unit is fastened on one end on the pull rod 11 and on the other side on the winding-up device 14. The pull rod 11 is parallel to the axis A of the winding-up device.

The winding-up device 14 typically comprises tensioning means for exerting tension on the web 15, in the direction of the length of the latter between the rod 11 and the winding-up device 14, in a manner which is known per se and is not explained here in detail.

The frame 10 comprises a forward cross member 103 which connects the two rails 102, parallel to the rearward cross member 101 and opposite thereto. The forward cross member 103 has a C-shaped cross section which is open in the direction of the rearward cross member 101. As shown in FIG. 3, the pull rod 11 fits in between the wings of the "C" when the web 15 is located in the expanded position.

The web 15 is woven while integrating a network of optical fibers 150. The optical fibers 150 extend parallel to the expansion direction F1. In the proximity of the pull rod 11 the optical fibers 150 are guided out of the web 15, and the ends of the fibers 150 are grouped together and clamped in a ring in order to form a head 151. The head 151 is fastened on the pull rod 11. The end of the optical fibers 150 is machined on the end face, in order to represent a unified surface 1510. The optical fibers 150 are composed of plastic, such as polycarbonate or polymethyl methacrylate, for example, and have a diameter in the order of 0.25 mm to 1 mm. The web 15 also comprises other fibers which are typically used in weaving. The density of the network of optical fibers 150, the presence or otherwise of a covering therefor in the other fibers, and the directional orientation of the optical fibers make it possible for an infinite variety of designs and appearances of the covering unit 15 to be specified.

The forward cross member 103 of the frame 10 moreover supports a light source 16 which can produce light toward the rear in the expansion direction. The light source 16 is arranged in such a manner that the head 151 and the light source 16 are opposite one another when, in the expanded position, the pull rod 11 is closest to the forward cross member 103, as is shown in FIGS. 1 and 3. The light source 16 may be of a light-emitting diode type, an incandescent light bulb type, a fluorescent type or any other type. Said light source 16 is electrically supplied by the electrical network of the vehicle by means not illustrated.

Production of light by the light source 16 is prevented when the web 15 is not located in the expanded position. The light source 16 can be controlled to produce light when the web 15 is located in the expanded position. In this case, the light is received by the head 151, above all at the unified surface, and consequently by the ends of the optical fibers 150. The light progresses through the optical fibers 150 and is scattered along the latter, in order to give the impression that said light emanates from all zones of the web 15 in which the optical fibers 150 are arranged.

Figure 4:
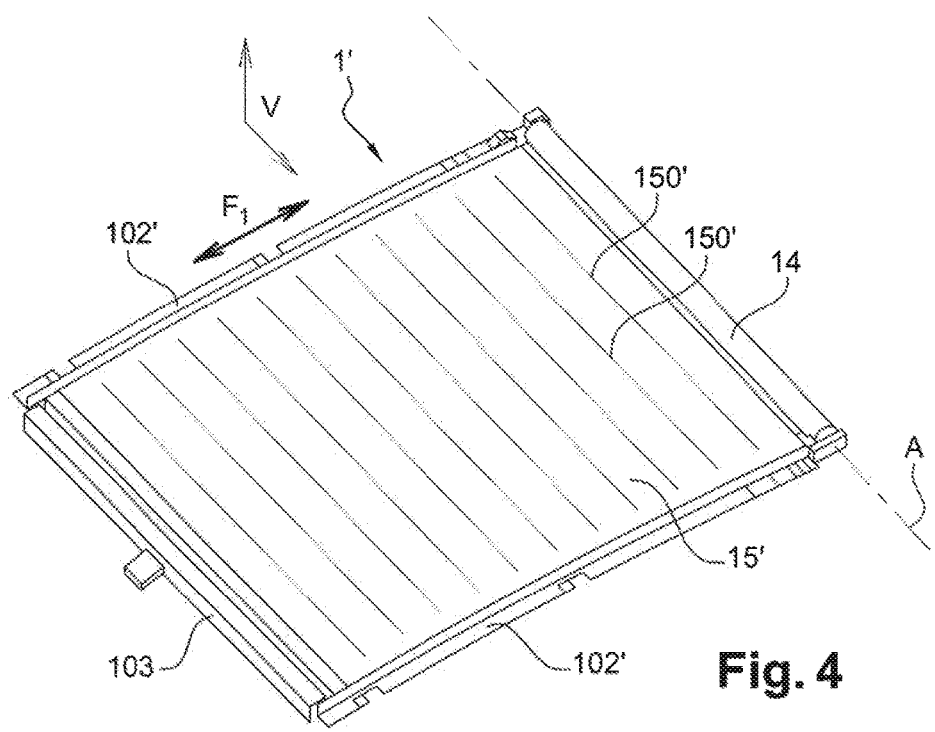
FIG. 4 shows a view, which is similar to that of FIG. 1, of a second embodiment of the invention.
Figure 5:
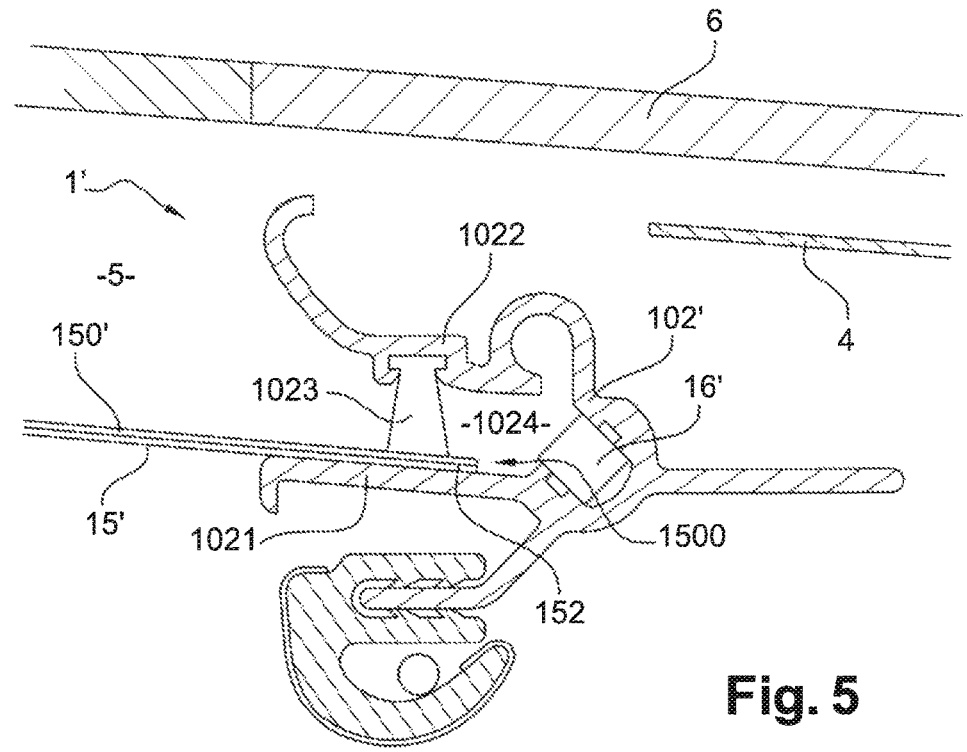
FIG. 5 shows a sectional view according to plane V of FIG. 4.
Figure 6:
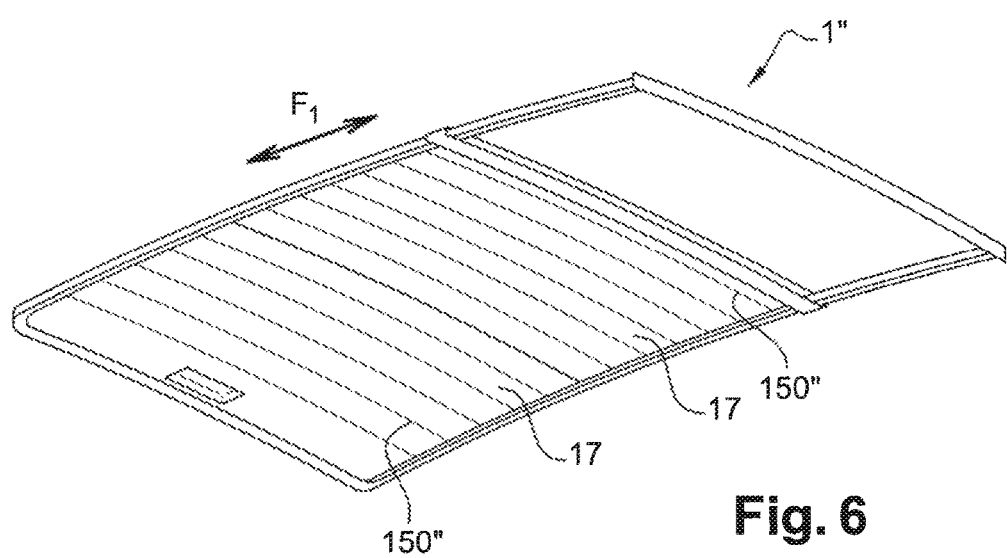
FIG. 6 shows a view, which is similar to that of FIG. 1, of a device according to a third embodiment of the invention.

With reference to FIGS. 4 and 5, a covering device 1' according to a second embodiment also comprises a covering unit from a web 15'. The latter differs from the first embodiment in that the optical fibers 150' are arranged parallel to the winding-up device 14 across the entire width of the web 15', as shown in FIG. 4. The ends 1500 of the optical fibers 150' are thus aligned with the lateral periphery 152 of the web 15'. The light source is not arranged on the forward cross member and the optical fibers are not grouped together at a head.

With reference to FIG. 5, the rail 102' comprises a wing 1021 which extends substantially in the plane of the web 15'. The web 15' should extend above the wing 1021. The rail 102' also comprises an upper wall 1022 which extends opposite the wing 1021, such that the web 15' lies between the wing 1021 and the upper wall 1022. The upper wall 1022 supports screening means in the form of a brush 1023 which extends along the entire length of the rail 102. The hairs of the brush 1023 are oriented toward the wing 1021 and bear thereon such that the web 15', when located between the brush 1023 and the wing 1021, is pressed against the wing 1021. The periphery of the web 15' is thus located in an illumination space 1024 which is delimited by the wing 1021, the brush 1023, and the upper wall 1022.

An optical fiber 16' is accommodated in a groove and comprises a light surface which is oriented toward the illumination space 1024 in order to fill the latter with light. The light in the illumination space 1024 is captured by the end of the optical fibers 150' and subsequently entirely scattered along the optical fibers 150'.

In a variant which is not illustrated the beam waveguide 16' may be substituted with a band of light sources, for example light-emitting diodes.

In a third embodiment the covering device 1" comprises two sliding rigid flaps 17 which form the covering unit. The flaps 17, on their lower side which is exposed toward the passenger cell of the vehicle, comprise a network of optical fibers 150" which are arranged in a transverse direction, as in the second embodiment.

The lateral peripheries of the flap 17, like the peripheries of the web 15' of the second embodiment, are engaged in an illumination space 1024 of the rails 102". The ends of the optical fibers 150" open into the illumination space 1024.

The same effect as in the second embodiment is thus obtained.

The invention is not limited to the embodiments which have just been described in an exemplary manner. The first embodiment could also be implemented in a covering unit which is made from one or more flaps.

The invention claimed is:

1. A covering device which is fixable opposite an opening of a motor vehicle, the covering device comprises comprising:

at least one element which is fastened on the circumference of the opening, wherein a covering unit is displaced in an expansion direction between a storage position, in which the covering unit is released from the opening and is wound up onto a winding-up device, and a covering position, in which the covering unit is extended opposite the opening, wherein the covering unit is fastened on one end on a pull rod, the pull rod being parallel to the axis of the winding-up device and being displaceable between the storage position and the covering position relatively to the at least one element along the expansion direction, wherein the covering unit comprises a network of optical fibers having lateral light scattering, wherein the network of optical fibers is supplied with light by at least one light source, wherein the light source is fastened on the element and, in order to supply the network of optical fibers with light, can illuminate ends of the optical fibers of the network in at least one illuminating position of the covering unit, wherein the illuminating position is the covering position, wherein the ends of the optical fibers are grouped together at the height of at least one head and the head is opposite to the light source in the illuminating position and is oriented in the expansion direction, the head being fastened on the pull rod, and wherein the element is a forward cross member of the covering device, the forward cross member being arranged opposite to the winding-up device along the expansion direction.

2. The device according to claim 1, wherein the element is a guide rail for guiding the covering unit in the expansion direction, and wherein the optical fibers comprise an end along a lateral periphery of the covering unit in order for the end to thus be illuminated by the light source.

3. The device according to claim 2, wherein said device comprises a plurality of light sources which are distributed along the rail.

4. The device according to claim 2, wherein the light source is a beam waveguide which extends along the rail and can scatter light in the direction of the covering unit.

5. The device according to claim 2, wherein the rail comprises a wing which extends substantially parallel to the covering unit, and wherein the rail comprises screening means in order to displace the covering unit toward the wing.

6. The device according to claim 5, wherein the screening means are a brush having hairs which protrude toward the covering unit, and wherein the covering unit is arranged between the brush and the wing.

7. The device according to claim 1, wherein the covering unit comprises a web of fabric which integrates the network of optical fibers.

8. The device according to claim 7, wherein the web in the storage position is wound up around a winding-up device.

9. The device according to claim 1, wherein the covering unit comprises at least one flap which on the surface is covered by the network of optical fibers.

* * * * *